April 8, 1941.  J. MUSERLIAN  2,237,948
SIZE GUIDE FOR PRESSING MACHINE COVERS
Filed March 16, 1939

INVENTOR
John Muserlian
BY
ATTORNEY

Patented Apr. 8, 1941

2,237,948

UNITED STATES PATENT OFFICE 2,237,948

SIZE GUIDE FOR PRESSING MACHINE COVERS

John Muserlian, New York, N. Y.

Application March 16, 1939, Serial No. 262,112

1 Claim. (Cl. 38—2)

This invention relates to new and useful improvements in a measuring guide pressing machine and pressing board cover.

More specifically, the invention proposes the construction of a cover consisting of a piece of fabric adapted to form a part of a pressing board or pressing table and in close proximity to which a rule or scale is mounted in a manner to be used by the operator of the machine to determine whether or not the garment is the desired length.

Furthermore, it is proposed to arrange the scale on different portions of the pressing machine where the garment being pressed may be conveniently measured.

Another object of the invention is to provide a means consisting of a plurality of brackets having clamping jaws mounted thereon for holding the scale in position upon a portion of the pressing machine.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Figure 1:
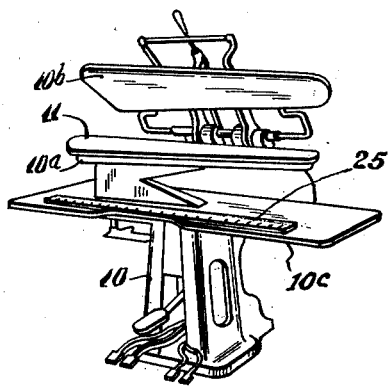
Fig. 1 is a perspective view of a pressing machine having a scale constructed according to this invention.
Figure 5:
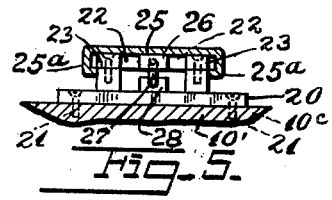
Fig. 5 is a sectional view taken on the line 5—5 of Fig. 4.
Figure 3:
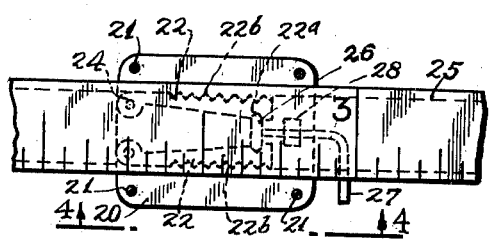
Fig. 3 is an enlarged partial plan view looking in the direction of the line 3—3 of Fig. 2.
Figure 4:
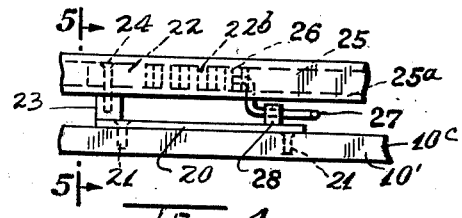
Fig. 4 is a view looking in the direction of the line 4—4 of Fig. 3.
Figure 2:
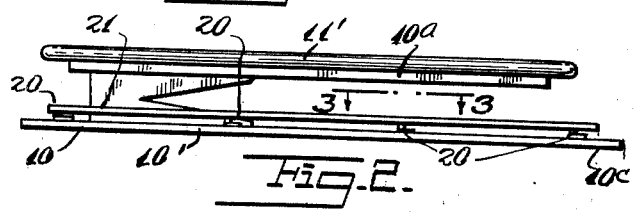
Fig. 2 is an enlarged front elevational view of a portion of Fig. 1.

The measuring guide for pressing machine covers, according to this invention, is to be used in conjunction with a pressing machine 10 having a table portion 10c supporting a pressing table 10a and a pressing head 10b.

The scale, according to this invention, includes a plurality of brackets 20 mounted at spaced positions along the length of the table 10c. These brackets 20 are secured in position by means of screws 21 which pass therethrough and which threadedly engage the table 10c. A pair of clamping jaws 22 is mounted on each of the brackets 20. Each bracket is formed with a pair of upwardly extending studs 23 upon which one end of the arms 22 is pivotally supported. Each arm 22 has a pin 24 freely passing therethrough and fixedly extended into its respective stud 23. A rule scale 25 having flanges 25a is engageable by the arms 22 for holding the rule scale upon the table 10c.

A means is provided for urging the arms 22 into an operative position for holding the scale 24. This means comprises a member 26 engaged between the adjacent edges of the arms 22 and which is adapted to be moved towards the free ends thereof and is engageable in niches 22a for spreading the arms to engage them against the inner face of the flanges 25a. This member 26 is mounted on an arm 27 which is slidably extended through a block 28 mounted upon the bracket 20 for permitting the member to be moved into and out of its operative position. The outer edges of the arms 22 are provided with a plurality of serrations 22b which are engageable with complementary serrations formed on the flange 25a for preventing any movement of the scale 25 when the arms 22 are in their operative position.

While I have illustrated and described the preferred embodiments of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

In combination with a pressing board or the head of a pressing machine, a plurality of brackets adapted to be attached thereto, a pair of clamping arms mounted on each bracket, means for urging said arms into operative positions, and a rule scale having flanges engageable by said arms for being adjustably supported by said arms, said means comprising a member engageable between the adjacent inner edges of said arms and movable towards the free ends thereof for spreading said arms against the inner face of the flanges of said scale.

JOHN MUSERLIAN.